Jan. 19, 1971  G. M. BROWN  3,555,634
RELEASABLE COUPLING
Filed Sept. 27, 1968  2 Sheets-Sheet 1
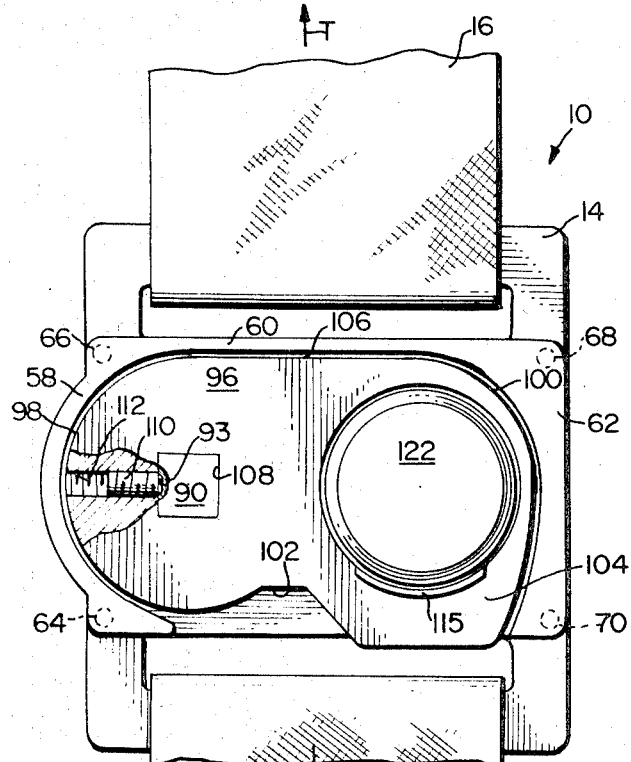
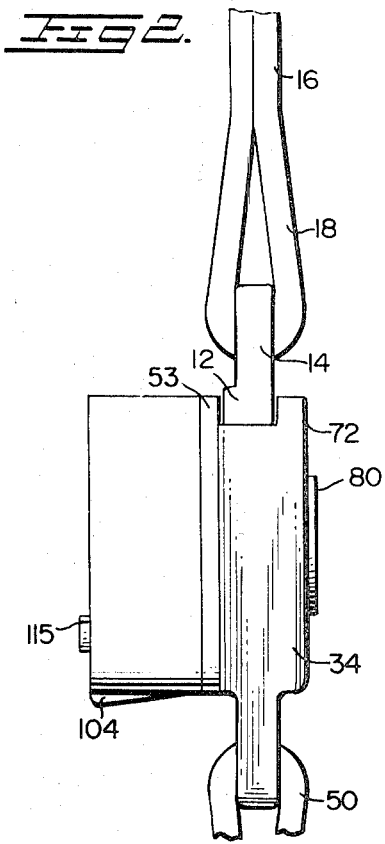
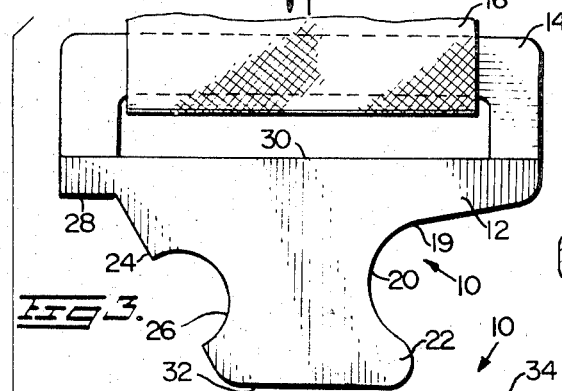
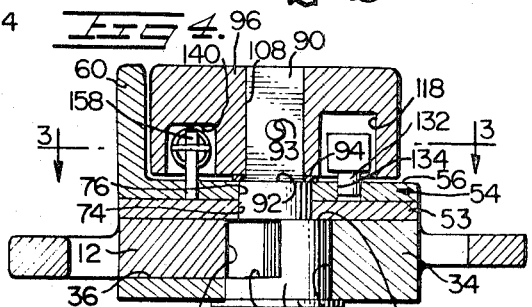
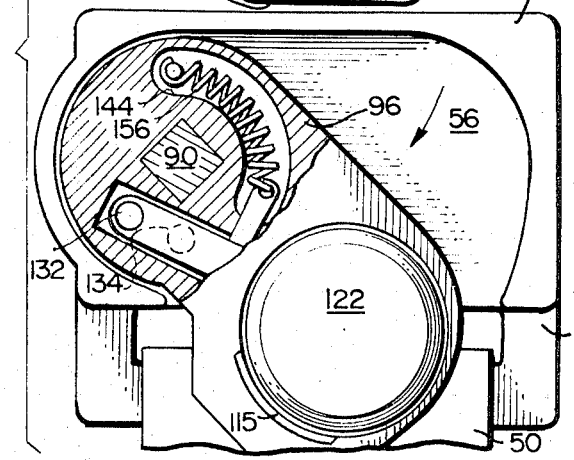
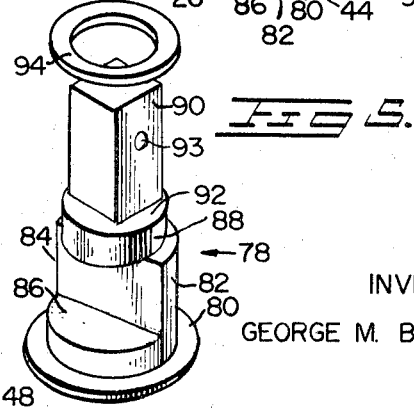
INVENTOR
GEORGE M. BROWN
ATTORNEYS

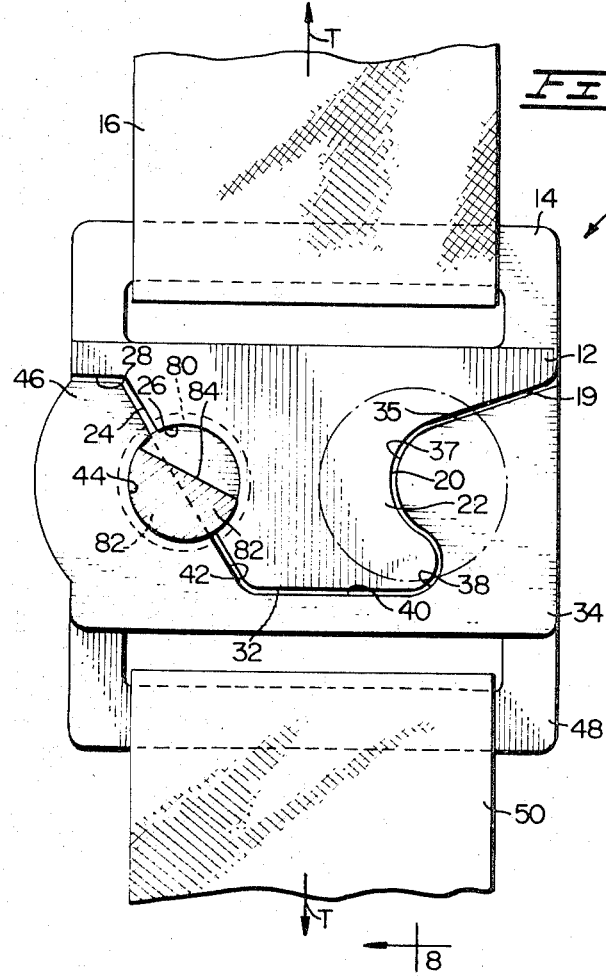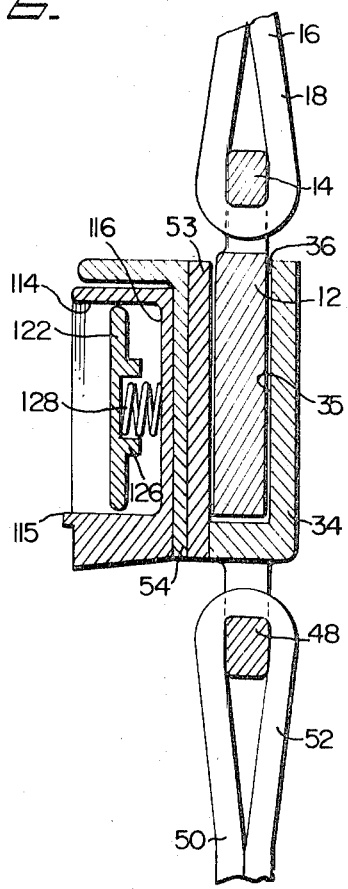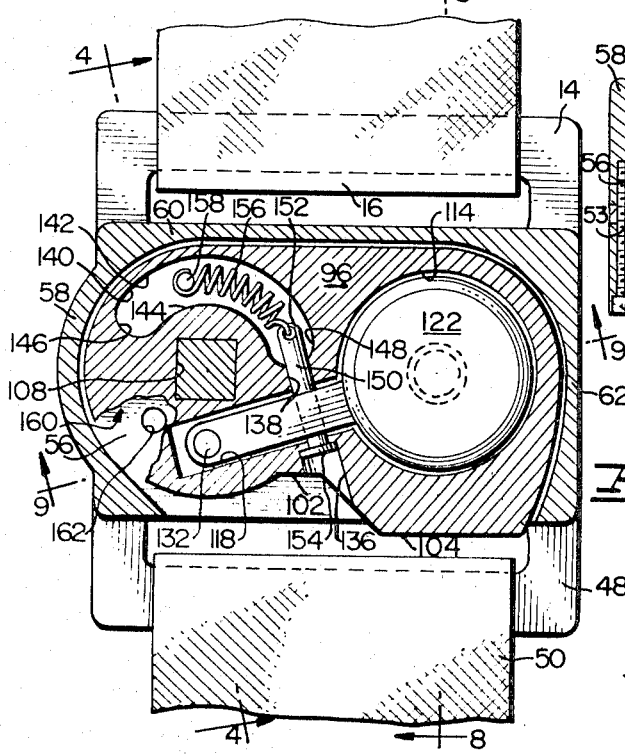

United States Patent Office 3,555,634
Patented Jan. 19, 1971

3,555,634
RELEASABLE COUPLING
George M. Brown, St. Petersburg, Fla., assignor to Sauna International, Inc., Miami, Fla., a corporation of Florida
Filed Sept. 27, 1968, Ser. No. 763,249
Int. Cl. A44b 11/00
U.S. Cl. 24—230
12 Claims

ABSTRACT OF THE DISCLOSURE

A coupling especially suited for releasably connecting the riser of a canopy or parachute to a harness and including male and female coupling members, the female coupling member being provided with a locking pin for fixedly securing the male coupling member in a locked position within the female coupling member, the invention further including a lever arm mounted for pivotal movement on the female coupling member and fixedly secured to the locking pin, the lever arm carrying a plunger mounted for pivotal movement to one end of a rocker arm carried by the lever arm, the other end of said rocker arm carrying a depending locating dowel which registers with a first aperture provided in the female coupling member in order to maintain the lever arm in a first position on a female coupling member, an operator of the device unlocking and permitting separation of the coupling members by depressing the plunger and causing the rocker arm to disengage the locating dowel from the first aperture, thereby permitting the operator to manually pivot the lever arm to a second position and cause rotation of the locking pin in order to unlock and allow withdrawal of the male coupling member from the female coupling member, the locating dowel upon such pivotal motion of the lever arm registering with a second aperture provided on the female coupling member for retaining the lever arm in said second position until disengagement of the male coupling member from the female coupling member is completed.

---

The present invention relates to a releasable coupling and, more specifically, to a releasable coupling having a male coupling member retained in locking relationship within a female coupling member and releasable upon actuation of a release mechanism actuated by a two-step operation.

Heretofore, there has been a long existing need for a quickly releasable coupling which may be firmly locked in an operative position. One exemplary coupling relates to a canopy release mechanism utilized for initially securing a body harness to a riser, commonly attached to the shrouds of a parachute or a canopy, which mechanism is releasable to extricate a user from the parachute subsequent to descent thereof. A two-step operation is usually required to actuate a canopy release mechanism in order to avoid accidental uncoupling, especially during the well known shock opening of a parachute. Such prior art coupling devices usually employ preloaded spring retaining mechanisms which are difficult to operate, since preloading in the springs must be overcome. Additionally, tension loads on the release devices caused by a wind filled canopy pulling on the risers further increase the difficulty of operation. Moreover, if rupture of the spring loaded mechanism occurs, the release mechanism becomes inoperative. The prior art release devices additionally require the use of two hands to actuate the required two-step release, precluding an injured user of the parachute to extricate himself therefrom.

The present invention overcomes the disadvantages inherent in the prior art canopy release mechanisms, and provides a releasable coupling which is actuable by a two-step operation, easily performed by a user thereof. In a preferred embodiment of the invention, a male coupling member is received in a female coupling member and is operatively, firmly locked in position by a retaining pin mounted for rotation in the female coupling female member. A lever arm is mounted for pivotal movement on the female coupling member and is fixedly secured to the locking pin. The lever arm carries a plunger mounted for pivotal movement to one end of a rocker arm, the opposite end of which rocker arm carries a locating pin which registers with a first aperture in order to maintain the lever arm in a first, fixed position on the female coupling member. To actuate a release, an operator of the device merely depresses the plunger causing the rocker arm to lift the locating pin from its aperture in order to permit pivotal motion of the lever arm to a second position. Upon such pivotal motion the locking pin is rotated to unlock the male coupling member from the female coupling member, thereby permitting its withdrawal therefrom. Additionally, the locating pin is brought into registration with a second aperture provided on the female coupling member in order to retain the lever arm in its second position, thereby preventing an inadvertent return pivotal motion of the lever arm, until the coupling members are fully disengaged. Accordingly, the invention provides a release mechanism which is actuated by performance of two separate actions, namely depressing a plunger and pivoting a lever arm, these separate actions acting in directions 90° with respect to each other in order to prevent inadvertent operation of the device. Additionally, only one finger of a user of the device is required to actuate a release, the ease of operation not being appreciably affected by tension forces on the coupling members tending to cause the disengagement thereof. The releasable coupling according to the invention is further characterized in that no lubricant is needed to actuate a release, no fragile spring loaded retaining mechanisms are utilized, rupturing loads experienced by the device are distributed over large bearing surfaces, the release mechanism is positively biased into a locked position on experiencing the well-known shock attributed to the opening of a parachute employing the invention, a release is effected easily under adverse contamination and weather conditions and is easily actuated by a user who is wearing heavy gloves or is partially disabled. Further, the device is suitable for use in many applications in addition to a canopy release mechanism. For example, its ease of operation permits its use as a seat belt for a passenger in a moving vehicle, the two-step operation required to release the mechanism preventing accidental disengagement thereof by a tampering child or upon shock of a collision. The releasable mechanism of the invention is well suited for use in conjunction with scuba equipment, for example, a weight belt, which equipment must be securely appended to a user thereof, yet quickly and easily discarded upon emergency.

It is therefore an object of the invention to provide a releasable coupling.

A further object of the invention is to provide a coupling which is releasable upon performance of two separate operations.

A still further object of the invention is to provide a canopy release mechanism which is positively baised into a locked position upon experiencing the shock attributed to the opening of a parachute.

Yet a further object of the invention is to provide a releasable coupling easily operable without lubricant under varying adverse environmental conditions.

Another object of the invention is to provide a coupling, the release of which requires the performance of two separate manual operations easily performed by a sole finger or thumb of the user of the invention.

Other objects and many attendant advantages of the present invention will become apparent upon consideration of the following detailed description thereof taken in conjunction with the drawings wherein:

FIG. 1 is a side elevation of the releasable coupling according to the invention together with associated webbing and illustrating one exemplary application of the invention, a part of the view being broken away to illustrate a particular connection between component parts of the invention;

FIG. 2 is a side elevation comprising an end view of the invention as illustrated in FIG. 1;

FIG. 3 is an exploded view illustrating the component parts of the invention illustrated in FIG. 1 in detached conditions, a portion of the lever arm illustrated in FIG. 1 being shown in a second fixed position and further shown partially broken away to illustrate in section the interior structure thereof;

FIG. 4 is a section generally along the line of 4—4 of FIG. 7, particularly illustrating the rotatable locking pin of FIG. 1;

FIG. 5 is a detailed perspective illustrating in exploded relationship the particular construction of a locking pin and associated washer according to the invention;

FIG. 6 is an elevation of the device as illustrated in FIG. 1, with parts removed and the locking pin of FIG. 5 illustrated in section, showing the particular manner in which the coupling members are lockingly secured together;

FIG. 7 is an elevation of the device, as illustrated in FIG. 1, partially in section to illustrate the specific structure of the lever arm illustrated in FIG. 1;

FIG. 8 is a section generally along the line 8—8 of FIG. 7; and

FIG. 9 is a section generally along the line of 9—9 of FIG. 7.

With more particular reference now being made to the drawings there is shown in FIG. 1 a manually actuable release mechanism generally indicated at 10 and comprising, as more particularly illustrated in FIGS. 3 and 6, a male coupling member 12 formed integrally with an attached, generally inverted U-shaped hitch 14 for connection to a webbing, a portion of which is shown at 16, which as shown in FIGS. 2 and 8, may be configured in a loop 18 which positively affixes the webbing 16 to the hitch 14. As best shown in FIGS. 3 and 6, a male coupling member 12 is configured at one side edge thereof with a laterally extending tapered sidewall 19 which is adjacent to a laterally inwardly directed, generally arcuate recess 20 immediately adjacent to an oppositely directed laterally projecting leg portion 22, the edge configuration of which is generally arcuate. The other, opposite side edge of the male coupling member 12 is of tapered configuration as indicated at 24. Centrally located along the tapered side edge 24 of the male coupling member 12 is a generally semi-circular recess 26 for a purpose to be specifically described hereinafter. As viewed in FIGS. 3 and 6, the tapered side edge 24 of the male coupling member 12 terminates at its uppermost portion in an inverted shoulder portion 28. The shoulder portion 28 is parallel to a straight elongated top side edge 30 of the male coupling member 12. The bottom side edge 32 of the coupling 12 is parallel to the top edge 30. Accordingly, the general shape of the male coupling member 12 may be described as being generally trapezoidal with generally arcuate recesses provided in its tapered side edges.

With reference to FIGS. 6 and 8, the male coupling member 12 is received in a female connecting member 34. More specifically, as shown in FIG. 6, the female coupling member 34 is provided with a recess defined along one side edge thereof by an inclined sidewall 35 terminating in a generally laterally extending, generally arcuate projecting side wall 37 complementary in configuration to the arcuate recessed portion 20 provided on the side edge of the male coupling member 12. The arcuate projecting side wall 37 is immediately adjacent to the laterally extending, generally arcuate recessed portion 38. As shown in FIG. 6, the recessed portion 38 is of complementary configuration to the laterally extending leg portion 42 of the male coupling member 12. The recessed portion 38 is continguous with an elongated straight bottom wall 40, complementary in configuration to the bottom edge 32 of the male coupling member 12. The bottom wall 40 is contiguous with another side wall 42 further defining the recess within the female coupling member 34. The side wall 42 is inclined and is complementary in configuration to the tapered side edge 24 of the male connecting member 12. The sidewall 42 is provided midway therealong with a generally semi-circular recess 44 immediately opposite to and similar in configuration to the semi-circular recess 26 provided on the male connecting member 12, when received in the female coupling member 34 as shown in FIG. 6. Together, in side by side relationship, the recesses 44 and 26 define a circular cutout portion, half of said circular cut-out portion being defined by the recess 26, and remaining half of the circular cut-out portion being defined by the recess 44. The inclined side wall 42 terminates in a shoulder portion 46 which abuttingly engages the shoulder 28 of the male coupling member 12 when received in the recessed female coupling member 34. It should be understood that the male coupling member 12 is freely manually insertable into the recessed female coupling member 34.

With reference yet to FIGS. 6 and 8, taken together with FIGS. 1, 3 and 7, the female coupling member 34 is provided with an appended, generally U-shaped hitch 48, similar in configuration to the hitch 14. The hitch 48 is especially suited for connecting the female coupling member 34 to a webbing 50 which may be provided with a looped portion 52 securing the webbing 50 to the hitch 48.

As specifically shown in FIGS. 8 and 9, taken together with FIG. 4, there is shown a generally rectangular cover plate 53 overlying the recess 35 provided in the female member 34. The cover plate 53 cooperates with the recessed female coupling member 34 to provide an enclosure generally surrounding the male coupling member 12 when it is manually inserted by a user of the present invention into the recess 35 of the female coupling member 34. The cover plate thus forms a removable top wall portion of the female coupling member 34. The cover plate 53, as shown in FIGS. 4, 8 and 9, is in turn provided with an overlying tray 54. As best shown in FIG. 1, in conjunction with FIGS. 8 and 9, the tray 54 comprises a flat, generally rectangular bottom wall 56 provided with three contiguous, integral, outwardly projecting sidewalls 58, 60 and 62. A plurality of cap screws 64, 66, 68 and 70 secure together the female coupling member 34, the overlying cover plate 53 and the tray 54. An exemplary showing of the cap screws is shown in FIG. 9 wherein the cap screws 65 and 68 are shown mounted flush with a side wall 72 of the female coupling member 34 and extending upwardly through the coupling member 34, the overlying plate 53 and into the outwardly projecting side walls 58 and 62, respectively, of the tray 56. The coupling member 34, the cover plate 53 and the tray 56 are thus removably secured together in progressively overlying relationship, the cover plate and the tray 56 being considered as removable portions of the female connecting member 34.

With reference to FIG. 4 of the drawings, the cover plate 53 and the bottom wall 56 of the tray 54 are each provided respectively with aligned vertically extending cylindrical apertures 74 and 76, which apertures are in communication with and axially aligned with the circular opening formed by the adjacent semi-circular recesses 26 and 44 provided in the male coupling member 12 and the female coupling member 34, respectively. The cylindrical apertures 74 and 76 are of equal size but are smaller in diameter than the circular opening defined by the adjacent recesses 26 and 44.

With reference now being directed to FIGS. 4 and 5, the latter figure particularly illustrates a generally elongated locking pin, indicated generally at 78. More particularly, the locking pin 78 comprises a generally cylindrical, low profile base flange 80 upon which is mounted an enlarged diameter latching plug 82 having a generally cylindrical sidewall. More particularly, the top portion of the latching plug 82 is relieved to provide a flat, generally rectangular side wall 84 contiguous with the cylindrical side wall of the latching plug 82. Accordingly, the cylindrical side wall of the plug 82, together with the flat rectangular side wall 84, defines a half cylindrical configuration for the upper portion of the latching plug 82. The bottom portion of the latching plug 82 is generally cylindrical and contiguous with the upper half cylindrical portion 84. The bottom portion is further characterized by a flat bearing surface 86 oriented 90° with respect to the flat rectangular side wall 84. The latching plug 82 is provided with an integral reduced diameter cylindrical shaft 88, the major axis of which is aligned with the major axis of the generally cylindrical latching plug 82, a flat, generally arcuate shoulder 90 being defined between the reduced diameter shaft 88 and the half cylindrical plug 82. With further reference to FIG. 5, the cylindrical shaft 88 is provided with an integral elongated shaft 90 of square cross section surrounded by a generally cylindrical segmented flat shoulder 92 defined between the shafts 88 and 90. A recess 93 is provided in one side wall of the shaft 90. Shown in exploded form in FIG. 5, a generally annular washer 94 is adapted to be received over the shaft 90 and resting on the segmented shoulder 92. More particularly, as shown in FIG. 4, the locking pin 78 is received in the circular opening defined by the adjacent semi-circular recesses 26 and 44 and the aligned apertures 74 and 76. More particularly, the cylindrical base 80 of the locking pin 78 abuts against the bottom of the female coupling member 34, the latching plug 82 is received in the aligned apertures 74 and 76. It is noted upon inspection of FIG. 4, the length of the latching plug 82 along its major axis is approximately equal to the thickness of the female coupling member 34, the shoulder 90 adjacent the latching plug 82 being in close proximity to the cover plate 53. The cylindrical bottom portion of the latching plug 82 is equal in thickness to the bottom wall 36 of the female coupling member 34, the flat bearing surface 86 being coplanar with the adjacent surface of the bottom wall 36.

With reference yet to FIG. 4, the reduced diameter cylindrical shaft 88 is received for rotation in the apertures 74 and 76 provided in the cover plate 53 and the tray 54. From an inspection of the preferred embodiment of the present invention illustrated in the figure, the length of the cylindrical shaft 88 along its major axis is equal to the combined thicknesses of the cover plate 53 and the bottom wall 56 of the tray 54. With the locking pin 78 mounted for rotation in the female connecting member, the cover plate 53 and the tray 54, the elongated shaft of square cross section 90 protrudes from the bottom wall 56 of the tray 54. The annular washer 94 thus rests partially on the segmented shoulder 92 adjacent the shaft 90 and partially on the bottom wall 56 of the tray 54.

With reference to FIGS. 1, 3, 4, 7, 8 and 9, the tray 54 is specifically provided for carrying a lever arm 96 mounted for pivotal movement over the bottom wall 56 of the tray 54 and upon the washer 94. The lever arm 96 is generally of elongated configuration with a first generally cylindrical end wall portion 98 and an opposite, generally cylindrical end wall 100. The cylindrical end wall 98 terminates in a recessed side wall 102, and the cylindrical side wall 100 terminates in an extended tab 105 immediately adjacent the recessed side wall 102. The recessed side wall and extended tab configuration permits identification of the lever arm orientation in a manner to be hereinafter explained.

The side wall 106 of the lever arm 96 opposite the recessed side wall 102 is generally flat and elongated in configuration and adjoins the cylindrical end walls 98 and 100. As best shown in FIG. 1, the projecting side walls 58, 60 and 62 of the tray 54 are of complementary configuration to the lever arm 96. More specifically, the side wall 58 is complementary in configuration to the adjacent generally cylindrical side wall 98, the side wall 60 is complementary in configuration to the elongated side wall 106, the side wall 62 is complementary in configuration to the generally cylindrical side wall 100. The tab 104 projects from the confines provided by the side walls 58, 60 and 62 for additional purposes of identification.

As best shown in FIGS. 1 and 4, the end portion of the lever arm, defined by the cylindrical side wall 98 is provided centrally thereof with an aperture 108 of square cross-section and complementary in configuration to the cross section of the elongated shaft 90 of the locking pin 78. The shaft 90 is received in the aperture 108 when the lever arm 96 is mounted on the tray 54 as described. As shown in the broken away portion of FIG. 1, a recessed set screw 110 is threadably inserted in a threaded bore 112 provided in the cylindrical end wall 98 of the lever arm 96. The end of the set screw 110 engages in the recess 93 provided in the square cross section shaft 90, thereby firmly securing the lever arm 96 to the shaft 90.

With more particular reference to FIGS. 7, 8 and 9, the pivotal lever arm 96 is provided centrally of the end portion thereof adjacent the cylindrical end wall 100, with a generally cylindrical recess 114 which, as shown in FIGS. 1, 2, 3, 8 and 9, is partially circumscribed by an arcuate projecting locating flange 115, the recess 114 terminating in a bottom wall 116 of the pivotal lever arm 96. With reference yet being made to FIGS. 7, 8 and 9, and, in addition, FIG. 4, the pivotal lever arm 96 is provided with an elongated, inverted channel 118 of generally square cross section, as illustrated in FIG. 4. As shown more particularly in FIGS. 7 and 9, one end of the channel 118 extends through the cylindrical side wall defining the recess 114. Accordingly, the channel 118 communicates with the bottom portion of the recess 114 immediately adjacent to the bottom wall 116 of the recess 114. Accordingly the channel 118 communicates with the bottom portion of the recess 114 immediately adjacent to the bottom wall 116 of the recess 114. With reference yet being made to the same Figs. disposed within the elongated channel 118, is a rocker arm 120, provided at one end thereof with a generally circular, upwardly projecting pushbutton pressure plate 122, the bottom portion of which is provided with an inverted cylindrical recess 124 (FIGS. 8 and 9) surrounded by a downwardly projecting, inverted annular flange 126. A coil spring 128 is received in the recess 124, the ends of the spring 128 respectively abutting against the inverted bottom wall of the aperture 124 and the bottom wall 116 of the lever arm 96, thereby retaining the pushbutton 122 in spaced relationship with respect to the bottom wall 116. It should be understood that the circular outer periphery of the pushbutton 122 is in close proximity with the surrounding cylindrical side wall defining the recess 114 in order to prevent impurities such as sand particles or water droplets from collecting in the elongated channel 118. Accordingly, in a preferred embodiment of the invention, the close tolerances between the pushbutton 122 and the sidewall of the recess 114 causes impurities to collect on the surface of the bottom 122 rather than permitting seepage thereof into channel 118. If desired, an inverted lip 120 may be provided at the intersection of the channel 118 and the recess 114, and in close proximity to the circular periphery of the pushbutton 122, in order to further prevent seepage of impurities into the channel 118.

As shown in FIG. 9, the rocker arm 120 is elongated and extends substantially along the entire length of the channel 118. Further, the rocker arm is provided at its end extends opposite from the pushbutton 122 with a dowel 132, a portion of which depends downwardly from the rocker arm 120. As thus shown in FIGS. 4 and 9, depending projection dowel 132 is in registration with a first aperture 134 of complementary configuration and provided in the bottom wall 56 of the tray 54. Such registration of the dowell 132 retains the pivotal lever arm 96 in an initial fixed position within the confines of the projecting side walls 58, 60 and 62 of the tray 54.

With more particular reference now being made to FIGS. 7 and 9, an enlarged diameter recess 136 is provided partially in the side wall 102 and partially extending through the tab 104 of the pivotal lever arm 96. The recess 136 communicates with a reduced diameter bore 138 extending through the channel 118 and perpendicular to its elongated length. The bore 138 is in communication with a generally semi-circular recess 140 partially circumscribing the square cross-section aperture 108. As shown in FIG. 4, the recess 140 is provided in the pivotal lever arm 96 and is of inverted configuration with a generally square cross section. With reference to FIG. 7, the semi-circular recess 140 is defined by spaced curved side walls 142 and 144 which terminate in rounded end walls 146 and 148. A fulcrum pin 150 is received in the bore 138, the end 152 of which pin is provided with an aperture and protrudes into the semi-circular recess 140, through the rounded end wall 148 thereof. The pin 150 is provided with an enlarged head 154 which is received in the recess 136 and abuts against the bottom wall thereof.

As shown in FIGS. 8 and 9, the fulcrum pin 150 pierces the rocker arm 120 approximately at its midportion, retaining the rocker arm 120 generally suspended within the channel 118. The coil spring 128 associated with the pushbutton 122 tends to pivot the rocker arm 120 about the fulcrum pin 150, thereby retaining the locating dowel 132 in the complementary aperture 134.

With reference again being made to FIG. 8, a coil spring 156 is provided within and generally extending along the elongated semi-circular length of the inverted recess 140. One end of the spring 156 is secured to the apertured end 152 of the fulcrum pin 150. The other end of the spring 156 is secured to an upwardly projecting pin 158. More particularly, as shown in FIG. 4, the pin 158 is secured in the bottom wall 56 of the tray 54 and projects upwardly therefrom into the inverted semi-circular recess 140 provided in the pivotal lever arm 96. As shown in FIG. 7, the pin 158 is initially in spaced relationship from the rounded end wall 146 of the semi-circular inverted recess 140. With reference yet to the figure, a portion of the pivotal lever arm 96 is illustrated partially broken away at 160 to more particularly illustrate a second aperture 162 provided in the bottom wall 56 of the tray 58. The aperture 162 is similar in configuration to the aperture 134 as allustrated in FIG. 9 and is in spaced relationship therefrom. It is understood that in FIG. 7, the pin 132 is in registration with the second mentioned aperture 162, upon pivotal motion of the lever arm 96 in a manner to be hereinafter explained, in the Fig., the aperture 134, in spaced relationship with the aperture 162, being shown in dotted line.

In a typical application of the device, reference will be made to FIGS. 1 and 2 wherein the webbing 16 may comprise a riser affixed to shrouds (not shown) of a parachute, also not shown for clarity. The webbing 50 secured to the female coupling member 34 may be attached to a body harness, not shown, of a user of the parachute. As shown in FIG. 6, the latching plug 82 of the locking pin 78 is oriented in the circular opening defined by the recess 26 in the male coupling member 12 and the adjacent recess 44 in the female coupling 34. A portion of the cylindrical side wall of the latching plug 82 impinges against the curved side wall defining the recess 26 in the male coupling member 12, the remaining portion of the cylindrical sidewall of the latching plug 82 impinging against the curved side wall defining the recess 44 in the female coupling member 34. Accordingly, in its initial position as shown in FIG. 6, the latching plug 82 lockingly retains the male coupling member 12 in the recess 35 of the female coupling member 34.

With more particular reference to FIGS. 1 and 2 of the drawings, together with FIGS. 6 and 8, in the typical application described, substantial tension forces in the direction of the arrows identified by T in FIGS. 1 and 6 tend to separate the coupling members 12 and 34. It can be seen in FIG. 6 that the greater the tension forces T become, the greater the plug 82 will be in compression between the side walls defining the adjacent recesses 26 and 44, the plug thereby preventing undesirable uncoupling of the members 12 and 34. Accordingly, the diameter of the latching plug 82 may vary in accordance with the compression forces exerted thereon, which forces are determined by the particular use or application of the coupling 10. For example, its use as a coupling for seat belts would result in lower compression forces on the plug 82 than its use as a canopy release mechanism. The plug diameter thus can be made quite small by comparison if the device 10 is used in conjunction with seat belts. The coupling member 10 is well suited for use as a canopy release mechanism, since the tension forces T become quite large upon initiation of the well known shock caused by opening of the canopy. With the coupling member oriented as shown in FIGS. 1 and 2, such opening shock will create a transitory large compression shock on the latching plug 82, which tends to pivot the lever arm 96 in a counter-clockwise direction about the square cross section shaft 90 which secures the lever arm 96 to the latching plug 82. Accordingly, as shown in FIG. 1, the side wall 106 of the lever arm 96 will tend to impinge against the projecting side wall 60 of the tray 54, preventing any unwanted relative movement therebetween.

Pivotal motion of the lever arm 96 in a clockwise direction is initially prevented by the depending dowel 132 which, as shown in FIGS. 4, 7 and 9, is retained in the first described recess 134 provided on the bottom wall 56 of the tray 54. More specifically, as shown in FIG. 9, the coil spring 128 associated with the pushbutton 122 tends to pivot the rocker arm 120 about the fulcrum pin 150, thereby preventing unwanted disengagement of the dowel 132 from the aperture 134. Retention of the dowel 132 from the aperture 134 prevents any unwanted clockwise pivotal motion of the lever arm 96, as viewed in FIG. 1.

The tension forces T are present throughout descent of the parachute and also when the parachute is windblown, tending to drag a user of the parachute along the ground. Despite the presence of such tension forces, the male coupling 12 is easily manually uncoupled from the female coupling member 34 by a two-step operation performed by a user of the device. More particularly, the first step required to uncouple the members 12 and 34 is depression of the pushbutton 122, compressing the coil spring 128 and pivoting the rocker arm 120 about the fulcrum pin 150, thereby disengaging the dowel 132 from the aperture 134. The force required to depress the button 122 is only that necessary to overcome the stiffness of the coil spring 128 which is provided merely to retain the dowel 132 in the recess 134.

The second step required to effect the desired uncoupling is manually pivoting the lever arm 96 about an angle of approximately 35° to a second position illustrated in FIG. 3. Such pivotal motion is 90° with respect to the pivotal motion of the rocker arm 120. The bottom wall 56 of the tray 54 provides a bearing surface atop which the lever arm 96 is pivoted. Additionally, the washer 94 reduces the friction between the lever arm and the bearing surface. With the lever arm 96 pivoted to the position shown in FIG. 3, the attached locking pin 78 is caused to rotate about the generally cylindrical shaft 88, thereby rotating the latching plug 82 about an arc of approximately 35° to a second position as shown in phantom in FIG. 6. In such position shown in phantom, the half cylindrical configuration of the latching plug 82 is contained entirely with the semi-circular recess 44 provided in the female coupling member 34, the straight side wall 84 of the plug being coplaner with the inclined side wall 42 of the recess 35 provided in the female-coupling member 34. With the latching plug 82 within the confines of the recess 44 described, the male coupling member 12 may be readily withdrawn from the recess 35, thereby affecting mutual uncoupling of the coupling members 12 and 34. The shoulder 86 of the cylindrical bottom portion of the plug 82 is coplaner with the bottom wall 36 of the female coupling 34 to permit easy withdrawal of the member 12. With the lever arm 96 pivoted, about an approximate angle of 35°, to the position shown in FIG. 3, the depending dowel 132 is brought into registration with the second mentioned aperture 162, shown in FIG. 7, provided on the bottom wall 56 of the tray 52. Accordingly, registration of the dowel 132 in the aperture 162 retains the lever arm 96 in the position illustrated in FIG. 3, thereby preventing return pivotal motion thereof until the male coupling member 12 is completely withdrawn from the female coupling member 34. As shown in FIG. 3, the coil spring 156 within the semi-circular recess 140 is elongated by the pivotal motion of the lever arm 96 and is brought into engagement against the semi-circular side wall 144 defining a portion of the recess 140. The semi-circular side wall 144 thereby shapes the elongated coil spring 156 in a generally arcuate configuration. The coil spring 156 is provided only as a return spring to assist a return pivotal motion of the lever arm 96. Such return pivotal motion is required whenever the coupling members 12 and 34 are to be manually locked together.

In order to lockingly couple the members 12 and 34 together, a user of the device 10 merely seats the male coupling member within the female coupling member and, depresses the push button 122, thereby compressing the coil spring 124 and disengaging the dowel 132 from the aperture 162. The action of the elongated, generally arcuate configured return spring 156 then pivots the lever arm 96 in a clockwise direction about the square cross section shaft 90, until the lever arm 96 is positioned within the confines of the projecting sidewalls 58, 60 and 62 of the tray 53 and the dowel 132 is brought into registration with the first mentioned aperture 134. Said return pivotal motion of the lever arm 96 rotates the latching plug 82 to the position shown in FIG. 6, thereby lockingly retaining the male coupling member 12 within the recess 35 of the female coupling member 34.

Accordingly, the invention provides a canopy release mechanism which is actuated only upon effecting a purposed sequential combination of motions acting in mutual perpendicular directions. It is noted that only one finger or a thumb of a user of the coupling is required to effect the desired actuation. It was found by experiment that with the tension forces T equaling 4,000 lbs., only 17 lbs. of force was required both to depress the pushbutton 122 and pivot the lever arm 96. The coupling 10 according to the invention is specifically designed to meet the U.S. Air Force requirements for a canopy release. More particularly, the canopy release according to the invention is actuated with less than 25 lbs. of force as described. With the coupling members 12 and 34 being in locked together relationship under a tension load of 7,000 lbs., the semi-cylindrical latching plug 82 is of sufficient diameter to withstand the compression forces exerted thereon. The close tolerances between the circular periphery of the pushbutton 122 and the surrounding cylindrical side wall of the recess 114 in the tray 54 resists the passage of contaminants, such as water vapor, sand and dust particles, into the interior structure of the device and impeding the operation thereof. More particularly, water droplets and other contaminants tend to collect on the surface of the pushbutton 122 and, the button will remain easy to depress, even if the collected water droplets freeze thereon. It was found by experiment that the release mechanism according to the invention will withstand the standard U.S. Air Force vibration test. Additionally, the lever arm 96 is retained as described in the pivoted position as shown in FIG. 3, thereby requiring a positive manual operation to return the lever arm and positively lock the coupling members together. Such manual operation is desirable since it obviates the need for a complicated automatic locking mechanism and eliminates the careless reliance placed upon the safe operation thereof.

The coupling device 10 according to the invention may be modified for an application wherein an automatic latching feature is desirable. For example, in another preferred embodiment, the second mentioned recess 162 may be dispensed with, thereby permitting automatic return pivotal motion of the lever arm 96. Accordingly, when a user of the coupling device 10 inserts the male coupling member 12 within the female coupling member 34, the lever arm 96 will pivot automatically by the action provided by the elongated coil spring 156 in order to rotate the latching plug 82 and positively lock together the coupling members as described.

Various other advantages of the invention are apparent. For example, the tolerances between the coupling members 12 and 34 may be quite large, thereby insuring their mutual registration despite the presence of sand and other contaminants in the recess 35. The male coupling member 12 is of generally flat configuration and easy to manufacture. The shear stresses thereon are distributed over the surface of the semi-circular side wall of the provided recess 26 and also along the oppositely oriented curved side wall 20 and the adjacent extended portion 22, thereby preventing any stress concentration tending to cause undesired rupture of either the coupling member 12 or the coupling member 34. The latching pin 82 is maintained in compression, the forces being distributed entirely about the cylindrical wall thereof, preventing its undesired rupture. The device does not require lubricant for operation and utilizes only one bearing surface 56. The invention will remain operational despite rupture of the washer 94 or the return spring 156. Additionally, since the tension forces T tend to retain the lever arm 96 in abutting relationship against the side wall 60 of the tray 54, the coupling member 10 remains intact despite rupture of the dowel 132 which depends from the rocker arm 120. Further, the dowel 132 is retained partially by friction forces within the recess 134, thereby insuring that the coupling member 10 remains intact upon rupture of the coil spring 128 associated with the pushbutton 122. The coupling member 10 is further characterized by the specific configuration of the recess side wall 102 and the extending tab 104 of the lever arm 96 which serves to identify by touch the location of the pushbutton 122. The semi-circular locating flange 115 adjacent the pushbutton 122 further aids locations of the pushbutton by touch of a user of the device. Additionally, the lever arm 96 together with the tray 54 completely encloses the structural components located within the channel 118 provided in the lever arm 96, isolating them from contaminants. As an added feature, the component parts of the coupling 10 may be easily disassembled by removal of the machine screws 64, 66, 68 and 70, and the fulcrum pin 154 for inspection and cleaning of the device.

Numerous other modifications and variations of the preferred embodiments of the inventions hereinbefore specifically described may be made without departing from the spirit or scope of the invention, for example, the preferred embodiment may be provided with a manual or automatic operated latch plug and used in combination with any structure requiring use of a releasable coupling, which coupling itself can be modified with any equivalent pushbutton pressure plate and pivotal lever arm actuating mechanism, as defined by the appended claims, wherein;

What is claimed is:

1. A releasable coupling, comprising:
a first coupling member,
a second coupling member,
locking means mounted on said second coupling member and releasably engaging said first coupling member for releasably locking together said first and said second coupling members,
manually actuable means operatively connected to said locking means and mounted for relative motion on said second coupling member,
locating means carried on said manually actuable means,
registration means provided on said second coupling member,
said locating means engaged and in registration with said registration means for initially preventing relative motion of said manually actuable means,
means operatively connected to said locating means and so constructed and arranged to be selectively manually displaced for disengaging said locating means from said registration means,
said manually actuable means being adapted for manual displacement for operatively disengaging said locking means from said first coupling member, thereby releasably unlocking said first and said second coupling members,
said last mentioned means including a rocker arm enclosed within said manually actuable means and provided on one end thereof with a pressure plate and at another end thereof with said locating means,
fulcrum means securing said rocker arm in said manually actuable means, and
said pressure plate including resilient means for resiliently biasing said locating means into registration with said registration means,
said rocker arm being adapted for manual displacement upon the application of pressure to said pressure plate for disengaging said locating means from said registration means against the resilient action of said resilient means.

2. A releasable coupling, comprising:
a first coupling member,
a second coupling member,
locking means mounted on said second coupling member and releasably engaging said first coupling member for releasably locking together said first and said second coupling members,
manually actuable means operatively connected to said locking means and mounted for relative motion on said second coupling member,
locating means on said manually actuable means,
registration means provided on said second coupling member,
said locating means being in registration with said registration means for initially preventing relative motion of said manually actuable means,
displaceable means provided on said manually actuable means and externally of said second coupling member,
said displaceable means including a single pressure plate operatively connected to said locating means and so constructed and arranged to be selectively manually displaced in order to remove said locating means from registration with said registration means, thereby permitting relative motion of said manually actuable means,
said pressure plate and said manually actuable means being adapted for respective sequential displacement by a single finger or thumb of a user of the releasable coupling, first upon displacing said pressure plate to disengage said retainer means from said registration means, and subsequently upon displacing said manually actuable means to disengage said locking means from said first coupling member.

3. The structure as recited in claim 2, wherein,
said locking means comprises a latching plug provided with a locking surface,
said first coupling member is provided with a sidewall defining a first recess, and
said second coupling member is provided with a sidewall defining a second recess adjacent to said first recess,
said latching plug locking surface being initially retained in compression between said sidewalls defining said first and second recesses, and so constructed and arranged to assume a position entirely within said second recess upon manual displacement of said manually actuable means, thereby permitting separation of said first and second coupling members.

4. The structure of claim 9, wherein said locking surface is substantially semi-cylindrical in configuration and said sidewalls defining said recesses are substantially semi-cylindrical.

5. The structure as recited in claim 1, wherein said registration means comprises a portion of said second coupling member, and wherein said locking means matingly engages said portion of said second coupling member for initially preventing relative motion of said manually actuable means.

6. The structure as recited in claim 1, wherein,
said locking means comprises a latching plug,
said first coupling member is provided with a sidewall defining a first recess,
said second coupling member is provided with a sidewall defining a second recess adjacent to said first recess,
said latching plug being initially retained in compression between the sidewalls defining said first and said second recesses, and so constructed and arranged to assume a position entirely within said second recess upon manual displacement of said manually actuable means, thereby releasably unlocking said first and said second coupling members, and
said second coupling member includes a projecting portion adjacent to said manually actuable means, said compression of said locking plug tending to impinge said manually actuable means against said projecting portion for preventing displacement of said manually actuable means.

7. The structure as recited in claim 1, wherein,
said manually actuable means is provided with a channel, and further including:
spring means contained within said channel and secured to both said fulcrum means and to said second coupling member,
said spring means being elongated upon manual displacement of said manually actuable means, thereby creating resilient action therein for causing return displacement of said manually actuable means.

8. The structure as recited in claim 7 and further including:
cooperating means provided on said second coupling member and cooperating with said locating means for maintaining said manually actuable means in a fixed position in opposition to the resilient action of said spring means.

9. The structure as recited in claim 8, wherein said locating means is disengaged from said cooperating means upon application of pressure upon said pressure plate against the action of said resilient means, thereby disengaging said locating means from said cooperating means and permitting displacement of said manually actuable means by the resilient action of said spring means.

10. A releasable coupling, comprising:
a first coupling member,
a second coupling member,
a locking pin rotatably mounted in said second coupling member and releasably locking together said first and said second coupling members, said pin being rotatable for releasably unlocking said first and said second coupling members,
a lever arm pivotally mounted on said second coupling member and connected to said locking pin,
locating means projecting from said lever arm and engaged in said second coupling member and releasably lockingly retaining said lever arm in a first position on said second coupling member, and
a rocker arm externally of said second coupling member and mounted for pivotal motion on said lever arm, said rocker arm further being operatively connected to said locating means,
said first and said second coupling members being mutually releasably unlocked, first upon manually pivoting said rocker arm to disengage said locating means from said second coupling member, and second upon subsequently, manually pivoting said lever to a second position, rotating said locking pin and releasably unlocking said first and said second coupling members.

11. The structure as recited in claim 2 and further including:
cooperating means on said second coupling member for releasably receiving said locating means in registration therewith subsequent to manual displacement of both said displaceable means and said manully actuable, means,
said cooperating means and said retaining means co-operating to prevent further displacement of said manually actuable means until said first and second coupling members are unlocked.

12. The structure as recited in claim 2, wherein,
said locking means comprises a latching plug having a locking surface thereon,
said first coupling member is provided with a sidewall defining a first recess,
said second coupling member is provided with a sidewall defining a second recess adjacent to said first recess,
said latching plug locking surface being initially retained in compression between the sidewalls defining said first and said second recess and so constructed and arranged to assume a position entirely within said second recess upon manual displacement of said manually actuable means, and
said second coupling member also including projecting means adjacent to said manually actuable means, said compression of said locking surface tending to impinge said manually actuable means against said projecting means for preventing relative motion between.

References Cited
UNITED STATES PATENTS

| | | | |
|---|---|---|---|
| 2,407,715 | 9/1946 | Manson | 24—205.17 |
| 2,459,223 | 1/1949 | Henderson | 24—230.1U |
| 2,899,732 | 8/1959 | Cushman | 24—205.17 |

FOREIGN PATENTS

| | | | |
|---|---|---|---|
| 1,099,122 | 3/1955 | France | 24—205.17 |

KENNETH DOWNEY, Primary Examiner

U.S. Cl. X.R.
24—230, 205.17